United States Patent [19]

Gallant

[11] Patent Number: 4,708,534

[45] Date of Patent: Nov. 24, 1987

[54] PARTICLE FEED DEVICE WITH RESERVE SUPPLY

[75] Inventor: Ben J. Gallant, Corpus Christi, Tex.

[73] Assignee: Airsonics License Partnership, Corpus Christi, Tex.

[21] Appl. No.: 830,686

[22] Filed: Feb. 18, 1986

Related U.S. Application Data

[63] Continuation-in-part of Ser. No. 727,199, Apr. 29, 1985, abandoned, Ser. No. 546,913, Oct. 31, 1983, abandoned, and Ser. No. 717,585, Mar. 29, 1985, Pat. No. 4,635,897, which is a continuation of Ser. No. 537,932, Sep. 30, 1983, abandoned, said Ser. No. 727,199, is a continuation of Ser. No. 526,653, Aug. 26, 1983, abandoned.

[51] Int. Cl.[4] ............................................. B65G 53/40
[52] U.S. Cl. ..................................... 406/75; 198/757; 406/124; 406/141
[58] Field of Search .................. 198/391, 757; 406/19, 406/28-30, 75, 124, 127, 141; 239/325, 346

[56] References Cited

U.S. PATENT DOCUMENTS

| | | | |
|---|---|---|---|
| 2,128,585 | 8/1938 | Hannay et al. | 291/25 |
| 2,170,832 | 8/1939 | Minich | 51/263 X |
| 2,421,498 | 6/1947 | Guedel | 51/263 |
| 2,533,331 | 12/1950 | Skinner | 406/75 |
| 2,588,212 | 3/1952 | Custer | 137/153 |
| 2,686,083 | 8/1954 | Hampton et al. | 406/141 |
| 2,696,049 | 12/1954 | Black | 32/58 |
| 2,738,234 | 3/1956 | Anderson | 406/75 |
| 2,900,138 | 8/1959 | Strate | 239/61 |
| 2,908,476 | 10/1959 | Hidding | 251/8 |
| 3,011,750 | 12/1961 | Johnson et al. | 251/5 |
| 3,034,263 | 5/1962 | McDaniel et al. | 51/12 |
| 3,110,991 | 11/1963 | Boettcher . | |
| 3,110,992 | 11/1963 | Keefe | 51/263 |
| 3,139,705 | 7/1964 | Histed | 51/8 |
| 3,149,759 | 9/1964 | Manley | 406/75 |
| 3,230,016 | 1/1966 | Gilbert et al. | 406/124 |
| 3,329,389 | 7/1967 | Clark | 251/4 |
| 3,350,053 | 10/1967 | Schmitz | 251/5 |
| 3,353,560 | 11/1967 | McCulloch | 138/30 |
| 3,364,533 | 1/1968 | Sibrava et al. | 24/243 |
| 3,415,276 | 12/1968 | Lind et al. | 251/7 |
| 3,429,549 | 2/1969 | Swanson | 251/4 |
| 3,490,732 | 1/1970 | Leroy | 251/5 |
| 3,551,469 | 5/1970 | Bell | 251/7 |
| 3,759,483 | 9/1973 | Baxter | 251/5 |
| 3,788,456 | 1/1974 | Ashibe | 406/75 |
| 3,882,899 | 5/1975 | Ginsberg et al. | 137/627.5 |
| 3,982,724 | 9/1976 | Citrin | 251/7 |
| 3,991,972 | 11/1976 | Eaton | 251/11 |
| 4,044,989 | 8/1977 | Basel et al. | 251/7 |
| 4,081,170 | 3/1978 | Doss, Jr. | 251/5 |
| 4,109,895 | 8/1978 | Smart, Jr. et al. | 251/41 |
| 4,177,969 | 12/1979 | Sieber-Muller | 251/9 |
| 4,180,236 | 12/1979 | Saarem et al. | 251/30 |
| 4,245,733 | 1/1981 | Kubota et al. | 198/391 |
| 4,295,631 | 10/1981 | Allen | 251/30 |
| 4,322,054 | 3/1982 | Campbell | 251/5 |
| 4,339,897 | 7/1982 | Thompson et al. | 51/436 |
| 4,342,407 | 8/1982 | Citrin | 222/485 |
| 4,354,984 | 10/1982 | Richardson et al. | 261/66 |
| 4,384,535 | 5/1983 | McKelvie | 198/757 |

FOREIGN PATENT DOCUMENTS

| | | | |
|---|---|---|---|
| 1960102 | 6/1971 | Fed. Rep. of Germany | 251/8 |
| 2439762 | 3/1975 | Fed. Rep. of Germany | 251/5 |
| 2045950 | 3/1979 | Fed. Rep. of Germany | 198/757 |
| 3105463 | 9/1982 | Fed. Rep. of Germany | 406/127 |
| 1347455 | 11/1963 | France | 251/8 |
| 151262 | 11/1979 | Japan | 198/391 |
| 69621 | 4/1983 | Japan | 406/124 |
| 693028 | 6/1953 | United Kingdom . | |
| 765329 | 1/1957 | United Kingdom . | |
| 1058273 | 2/1967 | United Kingdom . | |
| 1139839 | 1/1969 | United Kingdom . | |
| 1569827 | 6/1980 | United Kingdom . | |
| 2042128 | 9/1980 | United Kingdom . | |
| 2114526 | 8/1983 | United Kingdom . | |
| 1027768 | 4/1966 | U.S.S.R. . | |
| 479919 | 12/1975 | U.S.S.R. | 251/4 |
| 496410 | 2/1976 | U.S.S.R. | 251/4 |
| 787308 | 12/1980 | U.S.S.R. | 406/141 |

OTHER PUBLICATIONS

IBM Technical Disclosure Bulletin; Manner et al.; vol. 12, No. 8, p. 1153, Jan. 1970.

Primary Examiner—Andres Kashnikow
Assistant Examiner—Mary Beth O. Jones
Attorney, Agent, or Firm—Kenneth P. Synnestvedt; Charles H. Lindrooth

[57] ABSTRACT

Apparatus for feeding powder particles into a pressurized gaseous stream comprising a feed chamber having a helical particle feed channel, a reserve powder supply chamber above the feed chamber and a feed tube extended from the reserve powder supply chamber and arranged to deliver powder from the reserve supply to the bottom of the feed chamber and form a powder deposit in the central region of the bottom wall and lying within the angle of repose of the powder, a delivery duct communicating with the helical particle feed channel, and means for controlling the feed rate comprising means for controlling the vibration of the feed chamber.

4 Claims, 16 Drawing Figures

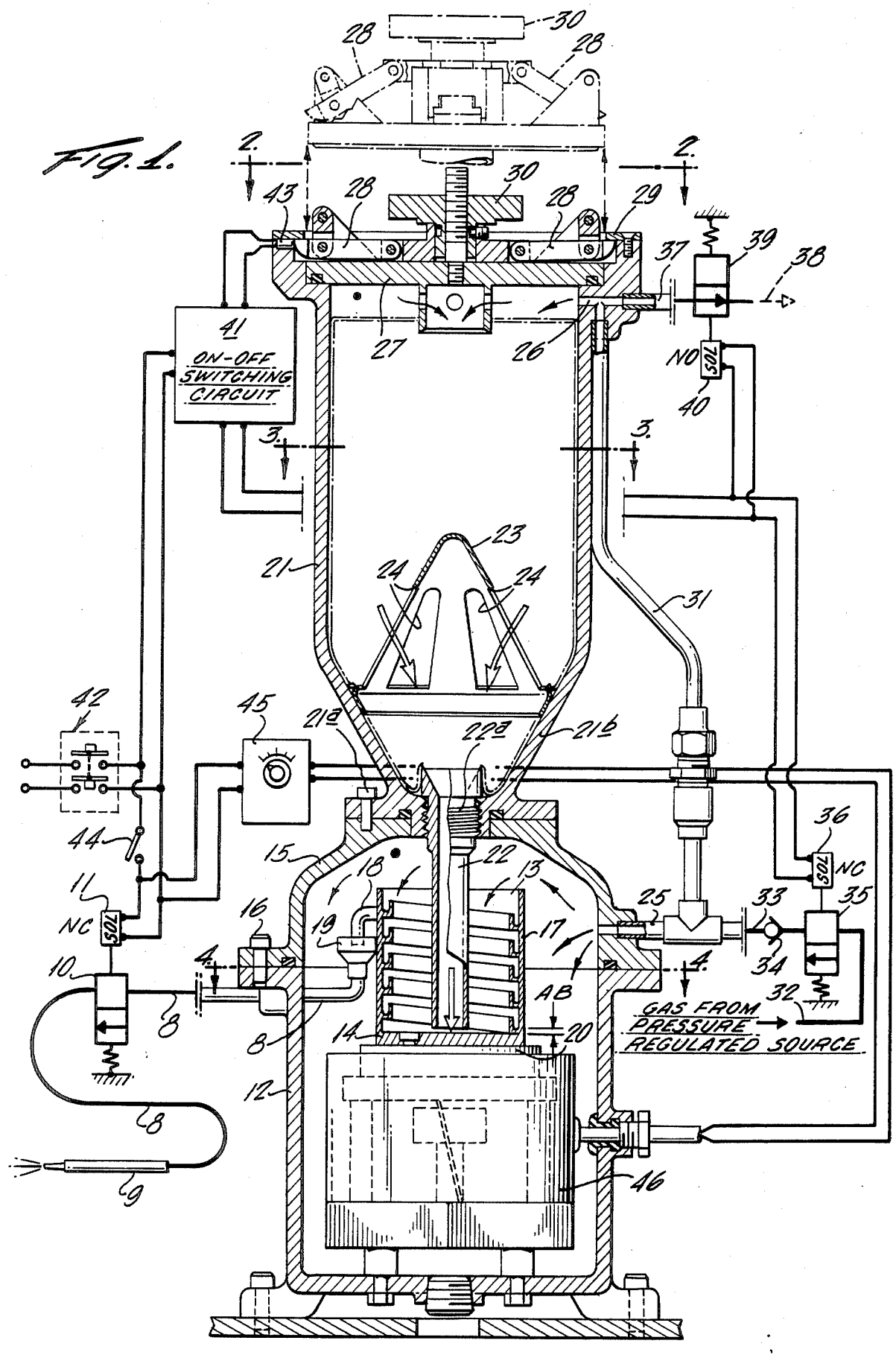

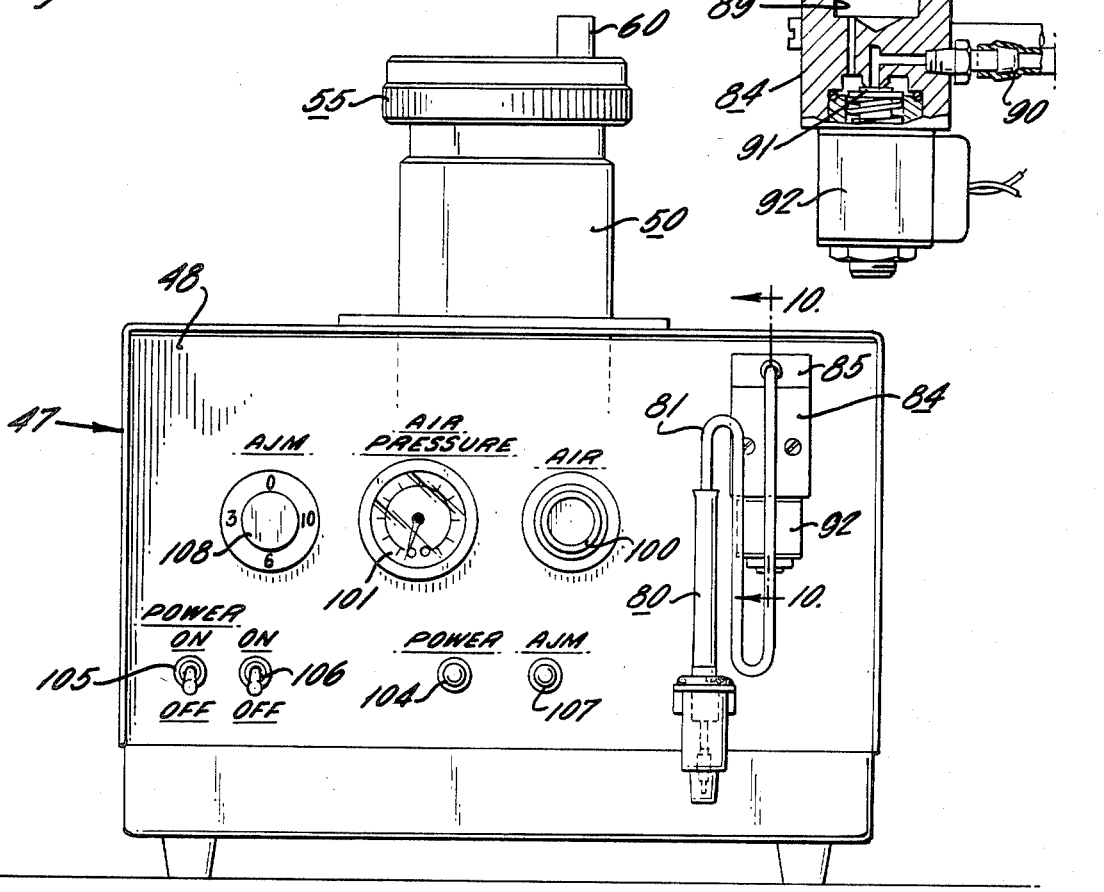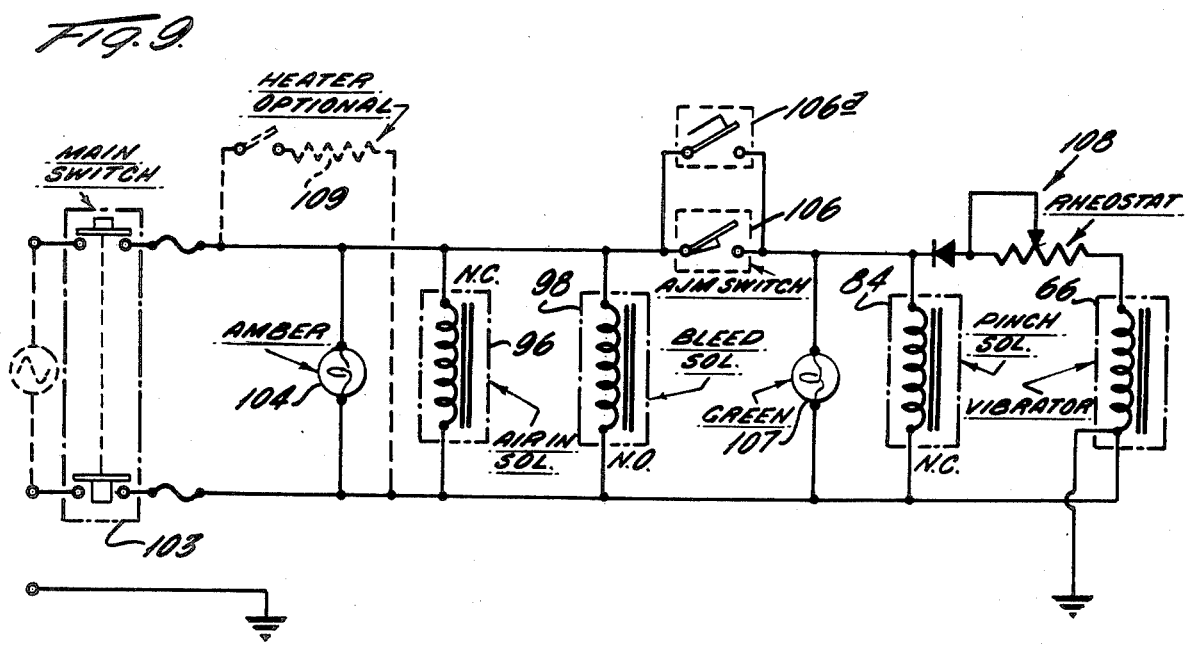

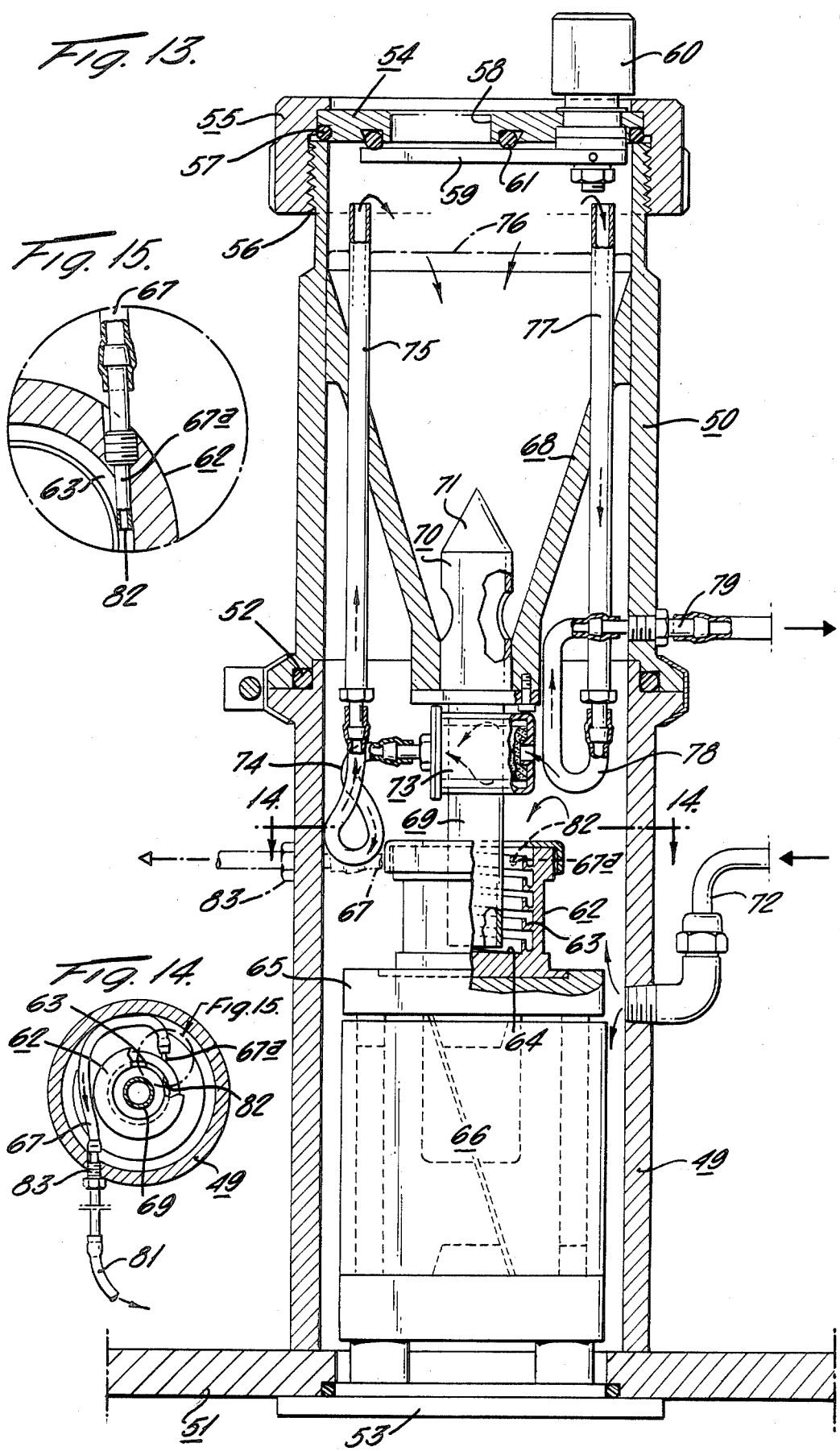

PARTICLE FEED DEVICE WITH RESERVE SUPPLY

CROSS REFERENCES

The present application is a continuation-in-part which is a continuation of application Ser. No. 727,199 filed Apr. 29, 1985, now abandoned, which is also a continuation of application Ser. No. 526,653 filed Aug. 26, 1983, now abandoned; and the present application is also a continuation-in-part of application Ser. No. 717,585 filed Mar. 29, 1985, and issued on Jan. 13, 1987 as U.S. Pat. No. 4,635,897, which is a continuation of application Ser. No. 537,932 filed Sept. 30, 1983, now abandoned; and the present application is still further a continuation-in-part of my application Ser. No. 546,913 filed Oct. 31, 1983, now abandoned.

BACKGROUND AND STATEMENT OF OBJECTS

This invention is concerned with the feeding of particulate materials, especially powder materials. While not limited, the equipment of the present invention is particularly adapted to the feed of abrasive particulate materials in a pressurized gas stream.

Because of the special adaptability of the apparatus to this type of use, the invention is illustrated in the drawings and described hereinafter in connection with an adaptation particularly suited to use for abrasive purposes.

It is an object of the present invention to provide a system for feeding particulate abrasive material into a pressurized gas stream and to maintain uniformity of feed of the particulate material into the pressurized gas stream, and thereby provide an abrasive-laden stream which is readily useable to perform a uniform abrasive operation, this being of a special importance in situations where moderate or delicate abrasion of sensitive products or articles is desired.

It is another object of the present invention to provide a system of the kind referred to in which the quantity of abrasive particles fed into the pressurized gas stream may readily and accurately be controlled in order to meet the abrasion conditions desired.

Still further, it is an object of the invention to provide a system which is capable of handling abrasive particles of varying degrees of fineness.

The invention is also concerned with equipment for the above purposes incorporating not only the particle feed mechanism itself, but also a special arrangement of a reserve supply container associated with the particle feed device. More particularly, the present invention is concerned with the use of a particle feed device of the type disclosed in my application Ser. No. 727,199 above-identified, the present invention being especially concerned with the employment, in combination with such a feed device, of a reserve particle supply container adapted to deliver the reserve supply of particulate material to the feed mechanism in a novel manner, as disclosed in my prior application Ser. No. 546,913 above-identified.

In accordance with one important aspect of the invention, the reserve supply container is of large capacity but is arranged in association with the particle feed mechanism in such manner as to provide for uniform introduction of a stream of the reserve material into the feed mechanism without causing packing or backing up of the particulate material, notwithstanding the large reserve supply available in the reserve supply container.

In accordance with another aspect of the invention, provision is made for pressurizing both the feed chamber and the reserve supply container, the pressurization being effected to establish the same pressure in both the reserve supply container and the feed chamber.

In accordance with still another aspect of the invention, provision is made for the employment of a particle feed mechanism of very small size when considered in relation to the volume of reserve particulate material available for feed from the reserve supply container. This is achieved by a special arrangement of feed mechanism for controlling the delivery of the particulate material from the reserve supply container into the feed chamber.

BRIEF DESCRIPTION OF THE DRAWINGS

How the foregoing and other objects and advantages are attained will appear more fully from the following description referring to the accompanying drawings, in which:

FIGS. 8 to 15 inclusive illustrate a second embodiment of the invention.

First Embodiment

Figure 1A:
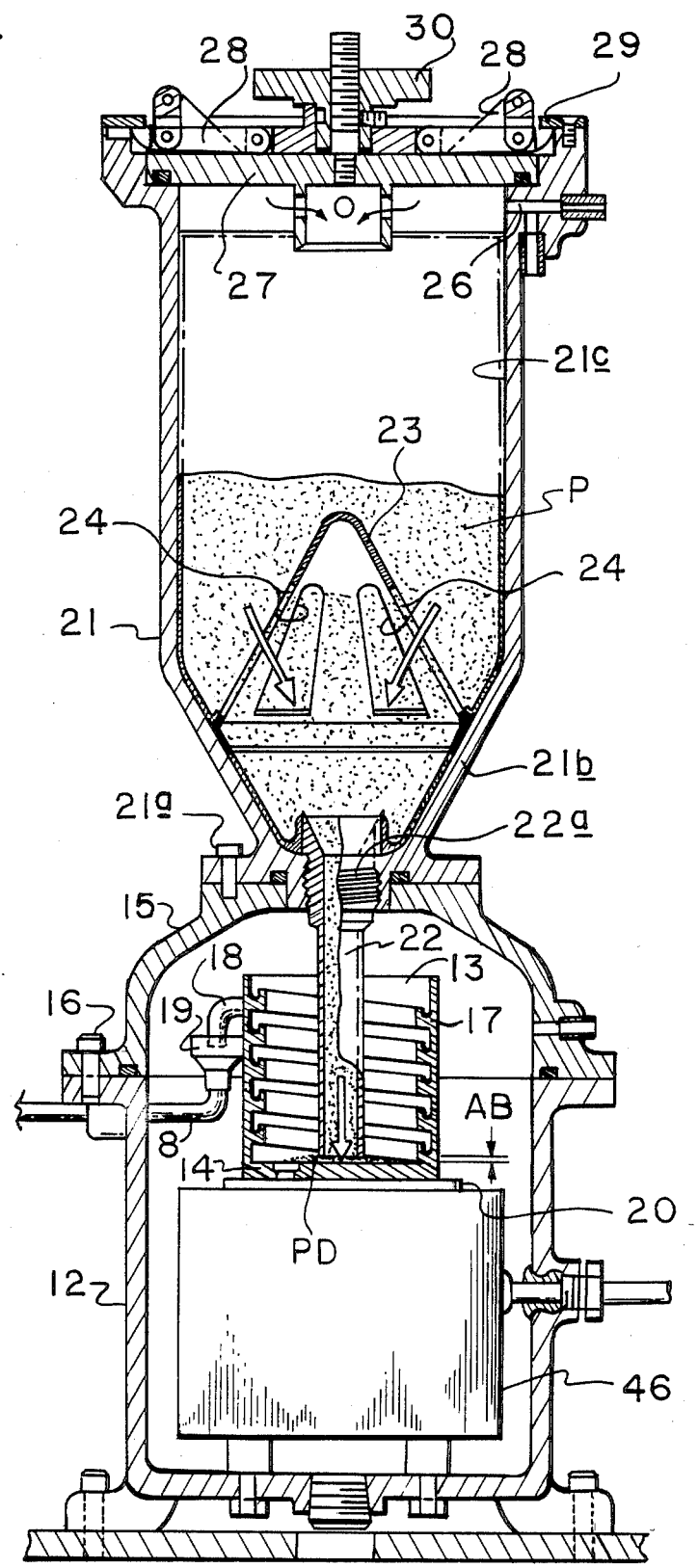
FIGS. 1 to 7 inclusive illustrate a first embodiment of the invention.
Figure 2:
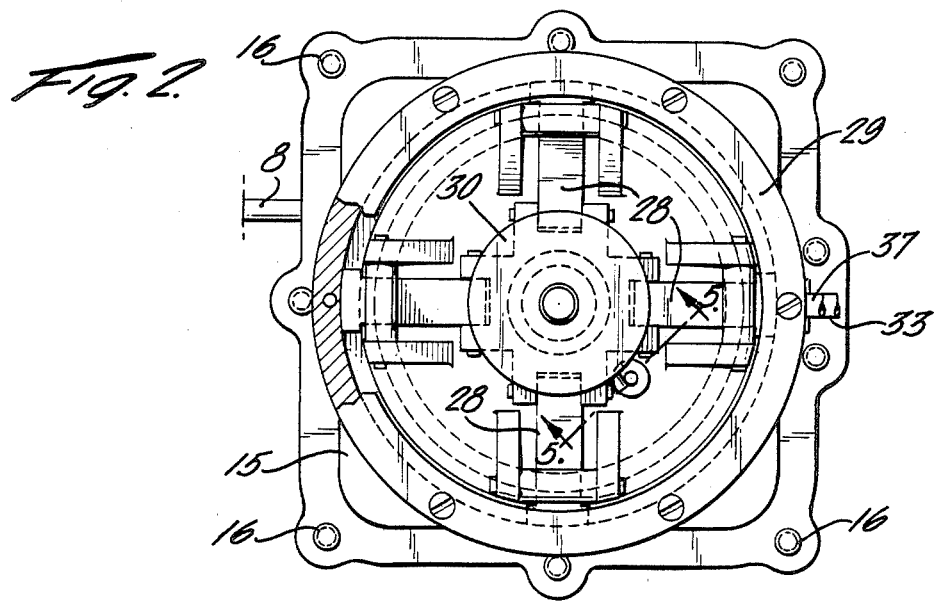
Figure 3:
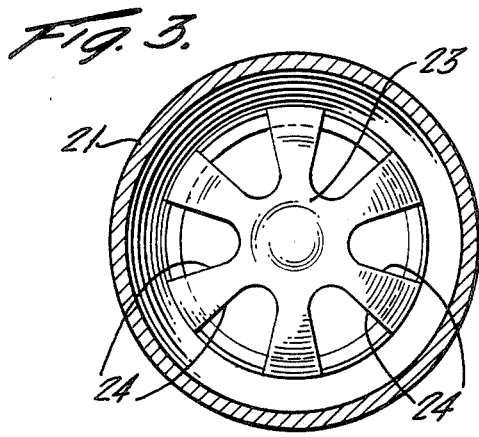
Figure 5:
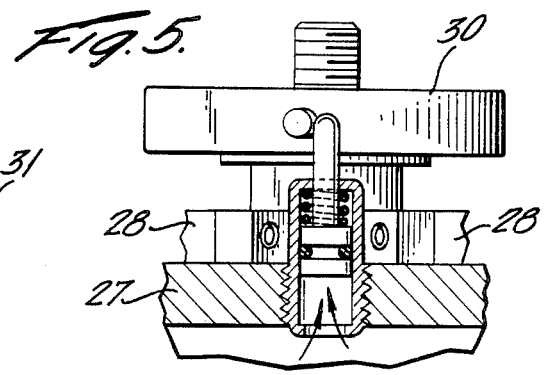
Figure 4:
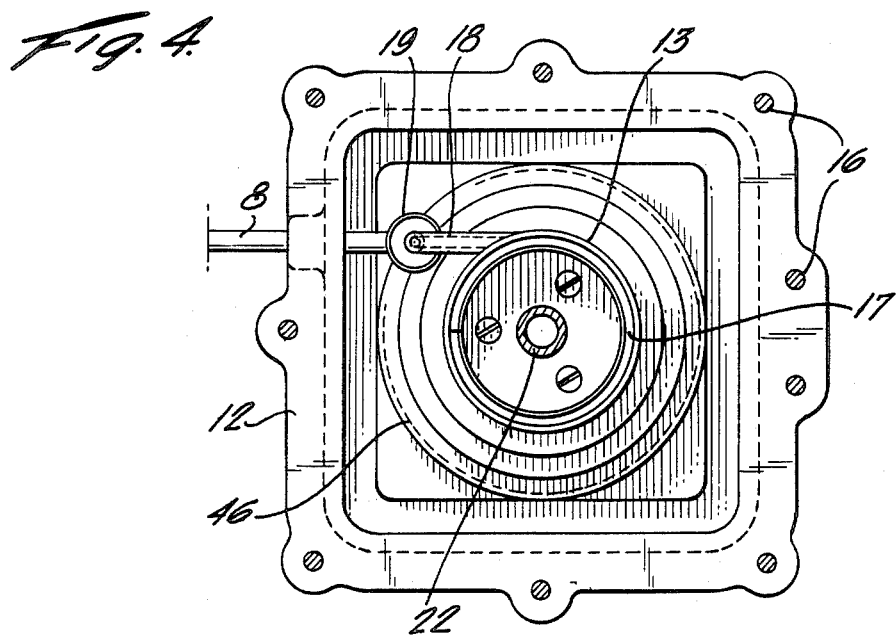
Figure 6:
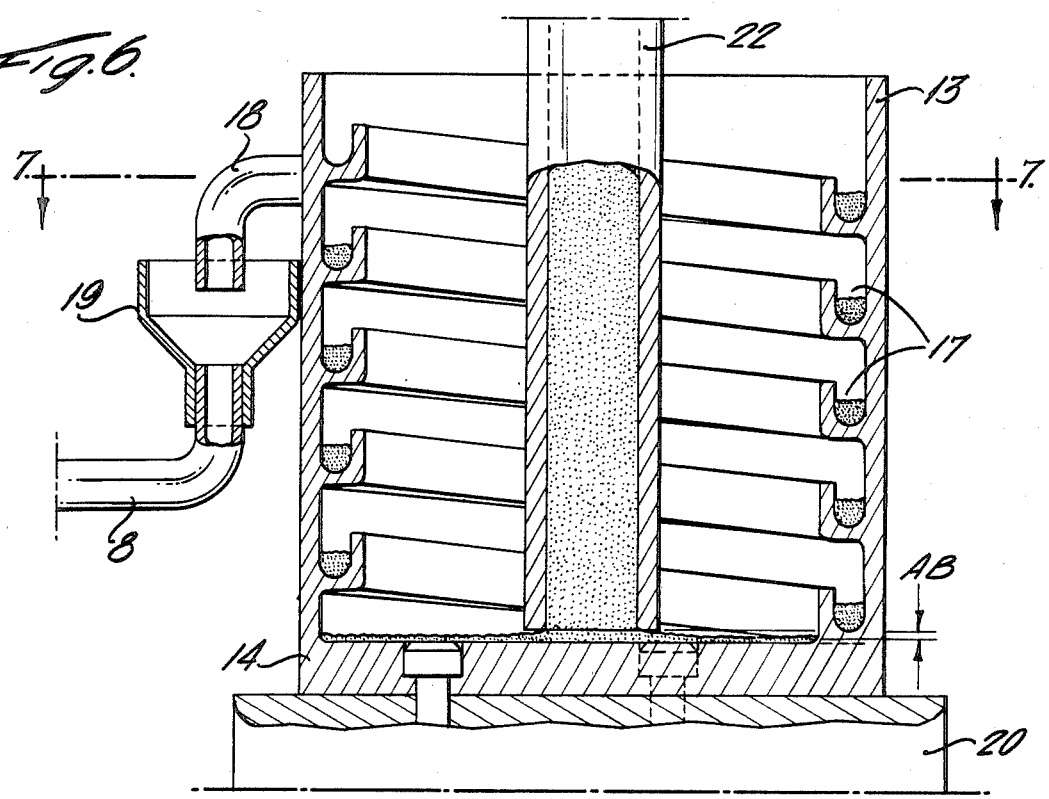
Figure 7:
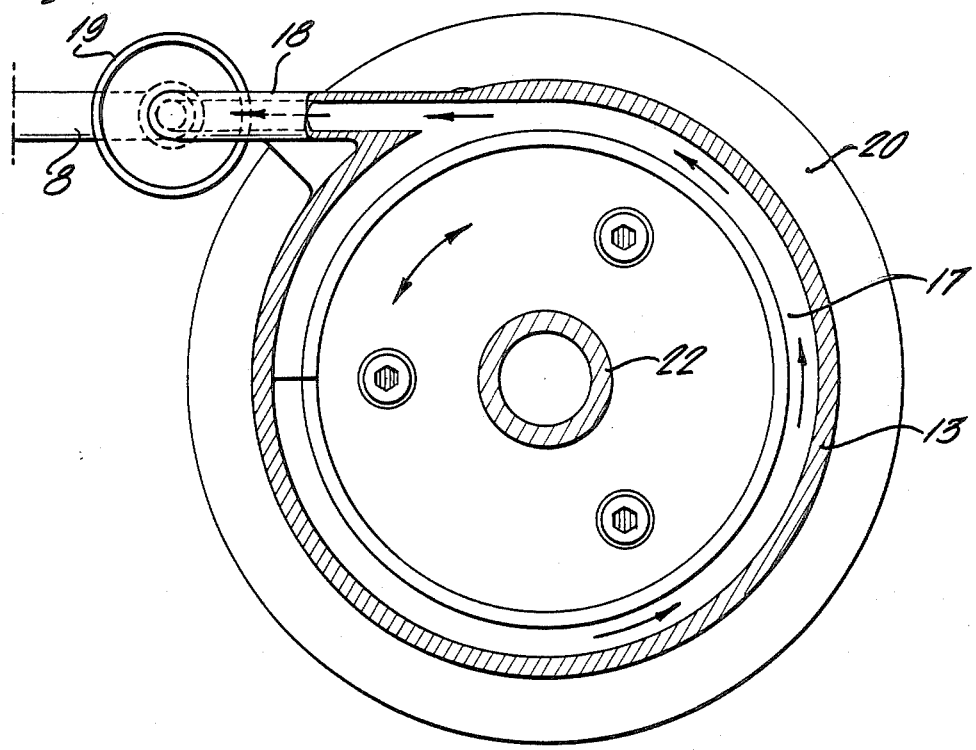

FIG. 1 is a vertical sectional view of a feed chamber and reserve supply container of the kind contemplated for use in accordance with the invention, this view also diagrammatically indicating certain of the electrical and pressure control systems preferably employed;

FIG. 1a is a vertical sectional view similar to FIG. 1 without the associated control systems, but showing the feed chamber and reserve supply container as shown in FIG. 1 and further illustrating the introduction of a charge of the abrasive powder to be delivered, the powder charge being shown as introduced but prior to the activation of the powder delivery mechanism;

FIG. 2 is a top plan view of the equipment shown in FIG. 1, this view being taken as indicated by the line 2—2 on FIG. 1 and illustrating certain parts in horizontal section;

FIG. 3 is a horizontal sectional view through the reserve supply container taken as indicated by the section line 3—3 on FIG. 1;

FIG. 4 is a horizontal sectional view of the feed chamber taken as indicated by the section line 4—4 on FIG. 1;

FIG. 5 is an enlarged fragmentary view showing certain parts of the lid closure mechanism for the reserve supply container, with some elements illustrated in vertical section;

FIG. 6 is an enlarged vertical sectional view of the helical feed device which is arranged within the feed chamber; and FIG. 7 is a horizontal sectional view of the feed device taken as indicated by the section line 7—7 on FIG. 6.

Second Embodiment

Figure 11:
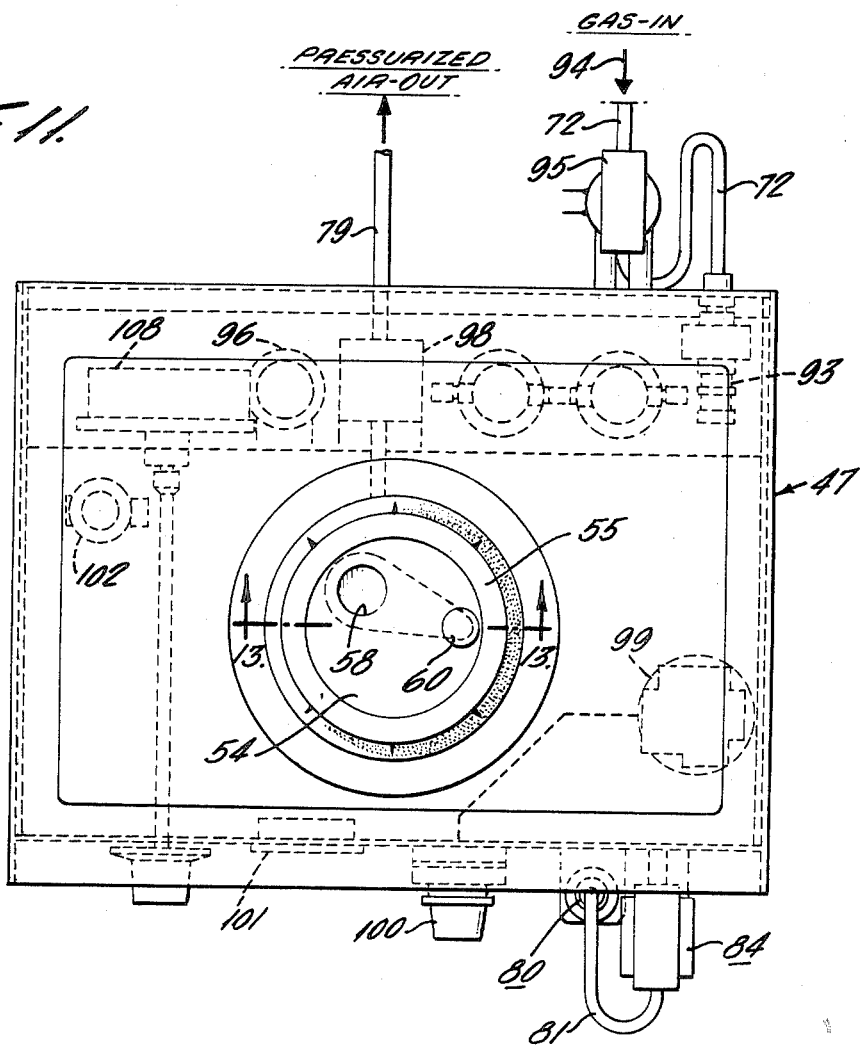
Figure 12:
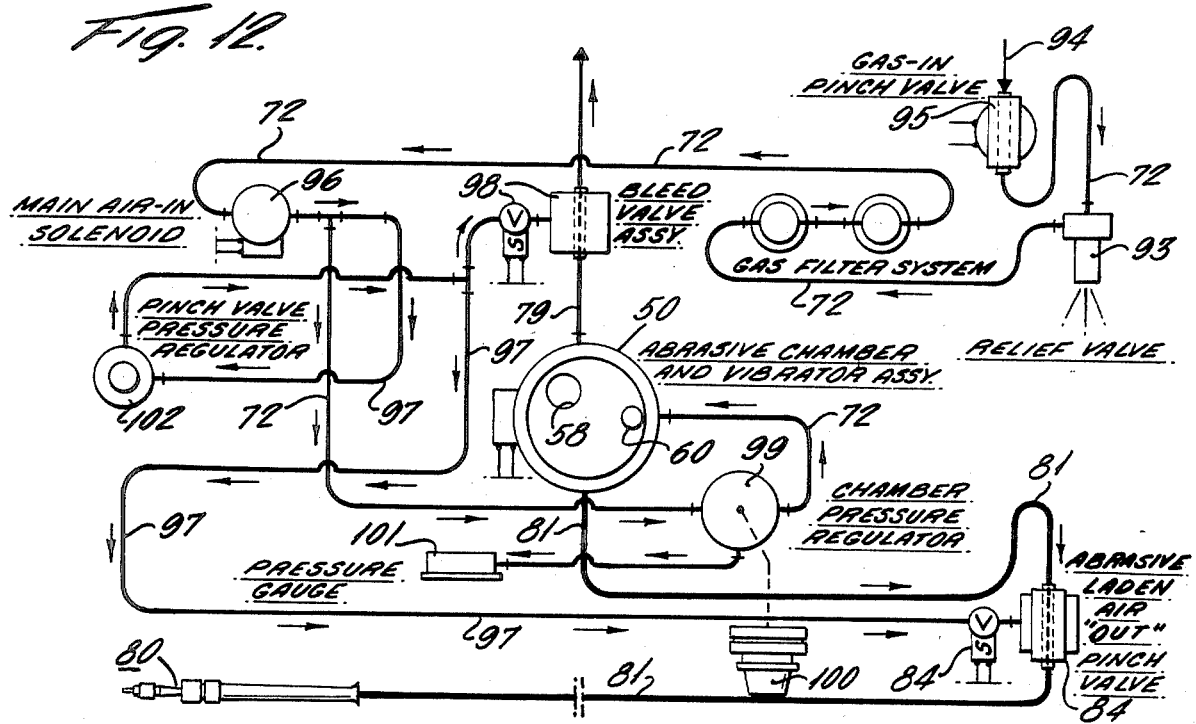

FIG. 8 is a front elevational view of the equipmnt, especially illustrating the control panel;

FIG. 9 is a circuit diagram illustrating the control system used in the second embodiment;

FIG. 10 is a partial sectional view taken on the line 10—10 on FIG. 8, showing a pinch-tube shut-off device employed in the system;

FIG. 11 is a top plan view of the equipment shown in FIG. 8;

FIG. 12 is a schematic view illustrating the pressure control system employed in the second embodiment;

FIG. 13 is an enlarged vertical sectional view through the particle feed mechanism and illustrating also the arrangement of the reserve supply chamber;

FIG. 14 is a horizontal sectional view on a reduced scale taken as indicated by the section line 14—14 on FIG. 13, and FIG. 15 is an enlarged view of the connection of the delivery duct with the helical feed channel, this view being taken as indicated by the circle marked "FIG. 15" on FIG. 14.

DETAILED DESCRIPTION OF THE DRAWINGS

The First Embodiment is described as follows:

As in my companion application Ser. No. 727,199 fully identified above, the equipment of the present invention is adapted to feed particulate material, for instance, an abrasive powder, through a gas flow duct 8 which serves to deliver a stream of pressurized gas, for instance, air, with particles dispersed therein, and adapted to be controlled by the normally closed valve 10 controlled by the solenoid 11. A nozzle, such as indicated at 9, may be employed to deliver the air/abrasive stream to the point of use, such as mechanical or electronic parts requiring controlled abrasion.

As seen in FIGS. 1 and 6, the gas flow duct 8 extends through the wall 12 of a feed chamber in which a vibratory particle feed device is incorporated. This feed device, as shown in the drawings, comprises a cylinder 13 having a closed bottom 14 but being upwardly open at the top to the interior of the feed chamber 12.

As shown in FIGS. 1 and 4, the feed chamber 12 is closed by an upper lid part 15, the two parts of the container being bolted together, as indicated at 16 in FIGS. 1 and 4. As in my companion application Ser. No. 727,199 above-identified, the cylinder 13 of the feed device is provided on its inner surface with a helical feed groove 17, the lower end of which communicates with the bottom of the cylinder 13 substantially at the bottom wall 14 thereof and the upper end of which communicates with the feed tube 18 which delivers the particulate material being fed from the helical groove 17 into the upwardly open funnel 19, the bottom of the funnel communicating with the feed or flow duct 8.

The cylinder 13 is of the vibratory type of feed mechanism, as is described in my copending application above identified. For this purpose, the device is mounted upon a base 20 comprising part of any of a number of well-known devices for developing a vibratory motion which, in this case, is transmitted to the chamber 13.

Devices 20 operated electrically are well-known, and may be provided with operating current through appropriate circuits, as will be referred to hereinafter.

The vibration generator may be of the type available on the market under the trade name SYNTRON, for instance, Model EB-00. Vibratory equipment of this type serves to generate the vibratory oscillations of the feed cylinder 13 and thereby causes the feed of the particulate material from the bottom of the cylinder upwardly through the helical groove 17 for delivery to the flow duct 8.

The arrangement of the connection of the delivery duct 8 with the helical feed channel of the vibratory cylinder 13 is of importance in establishing uniformity of feed of the particulate material. In the first embodiment (see particularly FIGS. 1, 4, 6 and 7), the upper portion of the helical feed channel 17 has a delivery opening presented horizontally and communicating with the entrance end portion of the delivery duct part 18 which in turn delivers the material to the duct 8. It is also preferred that the entrance end portion of the delivery duct part 18 be extended tangentially from the helical feed channel 17 and horizontally (as shown in FIGS. 1, 4, 6 and 7) from the delivery port of the helical feed channel, although the entrance portion 18 may alternatively be inclined downwardly. This arrangement is of importance in maintaining uniformity of feed from the helical channel into and through the entrance portion of the delivery duct.

The downward projection of the delivery end of the delivery duct part 18 into the upwardly open funnel 19 (see particularly FIGS. 1 and 6), without contact of the part 18 with the part 19 provides for the delivery of the particulate material while at the same time physically isolating the part 18 from the downstream portions of the delivery duct 8. This isolation is of importance because of the fact that the duct 8 extends through the wall 12 of the surrounding feed chamber which is in a portion of the equipment subjected to the vibration to which the cylinder 13 of the vibratory part of the equipment is subjected. In the first embodiment, the positioning of the duct part 18 to deliver into the funnel 19 also aids in establishing flow from the helical feed channel to the delivery flow duct 8.

In accordance with the embodiment of FIGS. 1 to 7, particulate material for feed from the helical groove 17 to the feed duct 18 is supplied to the cylinder 13 from the reserve supply container indicated at 21. This reserve supply container may be of substantial volume so that it will require loading or reloading only at infrequent intervals. The feed is effected from the bottom of the container 21 through the feed tube 22 which communicates with the bottom of the reserve container 21 and extends downwardly to a level close to the inside surface of the bottom wall 14 of the feed cylinder 13. The feed tube 22 has a readily separable threaded mounting 22a so that it may readily be removed and replaced by tubes of other sizes adapted to the feed of particulate materials of various types. The space between the lower end of the feed tube 22 and the bottom wall 14 is indicated by the symbols AB. The distance AB will be selected in accordance with the character, especially particle size, of the material being fed.

Attention is now called to the fact that the wall of the reserve supply container 21 converges downwardly, as indicated at 21b, and the inclination of this converging portion of the container wall will also depend on the character, including especially the particle size of the particulate material being handled. It is contemplated that the angle of the wall 21b be such that any remaining material in the reserve supply container will be fed downwardly by gravity into the feed mechanism so long as any material remains in the reserve supply container. This angle, therefore, should be related to the "angle of repose" of the material being handled. In other words, the angle of the portion 21b of the container wall should be sufficiently steep so that the material will not come to rest on the lower wall of the container but will continue to flow into the feed tube 22 and maintain the feed tube full of the particulate material. As examples of the inclination of the wall of the bottom 21b, for particulate material, such as aluminum oxide, having an average particle size of 50 microns, the angle should be about 60° with respect to the vertical. In the case of aluminum oxide having an average particle size of 10 microns, the angle should be about 30° with respect to the vertical.

The spacing AB between the lower end of the feed tube 22 and the bottom wall 14 of the vibratory feed cylinder 13 is also related to the angle of repose of the particular material being handled. This spacing (AB) should be sufficient to provide for continued feed of the material onto the upper surface of the bottom 14 of the feed cylinder and thus into the entrance end of the helical groove 17 when the vibrator is operating. However, the spacing AB should not be so great that when the vibrator is not operating the angle of repose of the powder would extend out to the periphery of the bottom wall and thus into the entrance of the helical feed channel. This would "flood" the bottom of the feed cylinder even when the vibrator is not operating and thereby excessively increase the amount of particulate material fed upwardly in the helical groove 17.

The reserve container 21 is adapted to be connected with the underlying feed chamber by means of bolts indicated at 21a. The formation of the reserve container 21 separately from the feed cylinder is desirable because this permits substitution of reserve containers of different sizes and shapes, thereby adapting the equipment to many different uses.

With respect to the reserve supply container, it is further noted that a device, such as indicated at 23, generally of cone shape is desirably positioned in the lower portion of the supply container, the inclined walls of this device having apertures 24 to provide for feed of the particulate material into the lower portion of the reserve supply container and thus into the feed tube 22. This device 23 may also serve to assume a portion of the weight of the supply of material in the reserve supply container and avoid extensive increase in the height of the column of material supported on the bottom wall 14 of the vibratory chamber 17. The device 23, in combination with the inclination of the reserve supply chamber wall 21b, acts to establish a predetermined load or pressure of the powder in the tube 22 on the bottom wall 14 of the feed cylinder 13, regardless of the quantity of the powder remaining in the reserve supply container, and this is important in establishing a uniform rate of feed of the powder upwardly through the helical channel 17 and into the delivery duct 18.

The reserve container may, if desired, be formed as a cartridge or may be adapted to receive a cartridge, for instance in the manner disclosed in my application Ser. No. 727,199 above-identified.

Thus, the cartridge may comprise a replaceable cartridge which is indicated in FIG. 1 by the dot-dash lines extended along and just inside of the inner surface of the reserve supply chamber 21. In FIG. 1, no reference numeral appears on the dot-dash line illustration of the repleacable cartridge, but in FIG. 1a, the replaceable cartridge is indicated by the reference numeral 21c, and in addition, the lower portion of the powder charge in that cartridge is indicated by the letter P.

The illustration of the powder P in FIG. 1a shows the presence of the powder not only in the reserve supply chamber 21 inlcuding the downwardly converging wall portion 21b and in the region below the apertured weight supporting device 23 which is above described in connection with FIG. 1. In FIG. 1a, the powder is also shown extended downwardly in the feed tube 22 to the upper surface of the bottom wall 14 of the vibratory feed chamber 13.

FIG 1a represents the condition present upon the introduction of the replaceable supply cartridge but prior to the activation of the mechanism for vibrating the feed chamber 13 including the bottom wall 14 thereof, as is required in order to start the feed of powder from the bottom wall of the feed chamber into and upwardly through the helical channel 17, for delivery to the delivery duct 18. As will be seen from FIG. 1a, the extent of the powder deposit PD on the top of the bottom wall 14 of the feed chamber is smaller than the diameter of the upper surface of the bottom wall 14. It will thus be seen that the introduction of the replaceable cartridge and the establishment of the powder in the path provided through the bottom portion of the reserve container 21 and downwardly through the feed tube 22 to the bottom wall of the feed chamber does not "flood" the bottom wall of the feed chamber, because in this non-vibratory state the powder deposit does not extend over the entire upper surface of the bottom wall 14 of the feed chamber.

The active feed of the powder upwardly through the helical channel 17 and to and through the delivery duct 18 thus does not occur until the control mechanism is initially activated to establish the vibration of the feed chamber 13. When the vibration of the feed chamber is established, the powder deposit on the bottom wall will be extended and will remain extended throughout the area of the bottom wall, which is the condition illustrated in FIG. 6. When the powder is extended throughout the bottom wall, vibration of the feed chamber 13, will then feed the powder upwardly through the helical channel 17 and into the delivery duct 18 whenever the vibration is occuring, but this upward flow will again terminate when the vibration is terminated by the control system. However, the non-vibratory powder deposit on the bottom wall will at that time remain as shown in FIG. 6, but will not be actively fed into the helical groove 17 because of the close spacing (A-B) between the bottom edge of the feed tube 22 and the bottom wall 14 of the feed chamber.

In the manner described hereinafter, it will be seen that the feed chamber 12 is supplied with gas, for instance, air under pressure through the connection 25. Similarly, a connection 26 serves to supply gas under pressure to the reserve supply container, and it is preferred that the feed chamber and supply container operate under equalized pressure conditions. This pressure induces the gas flow into the gas flow duct 8 into which the stream of particles is delivered in accordance with the feed rate established in the helical groove 17 of the vibratory feed cylinder 13 in the manner described above.

Because of the arrangements described above, it becomes possible to charge the overall equipment with a large volume of particulate material without adversely influencing the rate of feed either of the particulate material itself or of the gas introduced into the flow duct 8 for delivery to the point of use.

Because of the handling of the reserve supply of particulate material in the separate upper chamber indicated at 21 and because of the manner in which the material is fed from the reserve supply container through the feed tube 22 into the bottom of the vibratory feed cylinder 13, it becomes possible to provide a given rate of feed with vibratory equipment of much smaller size than would be practicable with various other forms of known equipment. In other words, these features make it possible to reduce the size of the vibratory feed cylinder and other associated parts.

These features have a further advantage in that particulate material even of very fine particle sizes can readily be handled and uniformly fed, notwithstanding the large overall reserve supply storage capacity of the equipment.

Before considering the electrical and pneumatic control systems, attention is directed to the structure at the top of the reserve supply container. A lid 27 is provided, being insertable into a circular cavity at the top of the chamber. The lid is provided with latch mechanisms indicated at 28, which mechanisms are adapted to be moved radially in order to engage under the annular ring 29. The action of these latches is adapted to be controlled by the knurled knob 30, or by other suitable mechanism providing for alternative engagement and disengagement of the latches 28 with the ring 29.

As above mentioned, both the feed chamber 12 and the reserve supply container 21 are adapted to be pressurized, and it is preferable that the pressure be equalized in the feed chamber and reserve container. From FIG. 1, it will be seen that the pressure connections 25 and 26 for the chamber 12 and container 21 are interconnected by the pipe 31, thereby assuring that the pressures will be equalized. The system may be supplied with a gas under pressure, for instance, air, in any desired manner, for example, by a supply line diagrammatically indicated at 32, and it is desirable that this supply line be connected with a pressure regulated source of the gas employed. The line 32 is adapted to be connected with the passages 25 and 26 and the interconnecting pipe 31 through the connection 33 having a check valve 34 and also a solenoid control valve 35 therein. The valve 35 is adapted to be operated by the solenoid indicated at 36, and this arrangement provides a normally closed valve openable by the solenoid when the master control for the equipment is turned on.

In a typical case where the equipment is used with an abrasive powder, the pressure in both the feeding chamber and the reserve container may be of the order of 5 PSI to 300 PSI, for instance about 85 PSI.

Provision is also made for discharge of the pressurized air from both the chamber 12 and container 21 through the discharge connection 37. This discharge connection may deliver to atmosphere through the exhaust pipe 38 when the valve 39 is open. The valve 39 is adapted to be controlled by the solenoid 40, and this represents a normally open solenoid valve so that the valve 39 remains open except when the master control is turned on.

The two solenoids 36 and 40 are supplied with current through the control switch diagrammatically indicated at 41. In turn, the control switch 41 receives current through the master power switch generally indicated at 42. The circuits extending from the switch 41 to the solenoids 36 and 40 are also controlled by the automatic shut-off device 43 which is arranged in the lid portion of the container 21 and which is shiftably movable under the influence of one of the latch mechanisms 28. When the control knob 30 is operated to engage the latches 28, the latch which is associated with the automatic shut-off device 43 is shifted to a position in which the circuit through the switch 41 is completed, in order to provide the operating current to the solenoids 36 and 40. When the latches 28 are withdrawn under the action of the control knob 30, the automatic shut-off device 43 prevents current from being delivered to the solenoids 36 and 40. This arrangement automatically prevents introduction of the pressurizing gas when the lid and its latches are not closed.

With the control equipment above described, it will be seen that closure of the master control switch 42 will provide for pressurization of both the chamber 12 and the container 21. When the master control switch 42 is opened, the NC solenoid 36 will close the valve 35, thereby shutting off the supply of compressed air, and the NO solenoid 40 will open the valve 39, thereby providing for bleeding off of the pressure from both of the chamber 12 and the container 21.

The master control switch 42 also controls the delivery of current to certain other devices, including the NC solenoid 11 which controls the delivery of the air-/abrasive stream through the delivery flow duct 8. This action is under the control of the manually operable switch 44. The switch 44 also controls the delivery of current to the device 45 through which the current is supplied to the vibrator mechanism 46 on which the base 20 for the vibratory cylinder 13 is mounted. The device 45 is in the nature of a control box regulating the intensity of the vibration communicated to the vibratory cylinder 13, and thus regulating the rate of feed of the powdered material into the gas flow duct 8. Because of this arrangement the vibratory feed action occurs only when the delivery duct 9 is open.

It will further be noted that the pressurization of the chamber 12 and the container 21 may be effected independently of actual delivery of the air/abrasive stream, which is desirable, since for most purposes when air/abrasive material is being handled, it is preferred that the pressure desired be pre-established, prior to the time the abrasive particles are used for an actual abrading operation. A time interval is, of course, required to build-up the pressure in the container and chamber, and once this is established, virtually instantaneous action of delivery of the abrasive stream can be effected at will by the operation of the manual control switch 44 which concurrently establishes the vibratory feed of the vibratory cylinder 13 and opens the valve 10 in the delivery duct 8.

The equipment herein disclosed is adapted to the handling of any of a variety of particulate materials, and is especially suitable for the handling of abrasive materials of fine or small particle size. Because of the employment of the reserve container 21 in combination with the feed chamber 12, it is possible to charge the equipment with a relatively large volume of the material to be handled, while at the same time permitting miniaturization of the vibratory equipment and the vibratory cylinder 13.

Because of the inclination of the walls 21a at the bottom of the reserve container and also the arrangement of the cone-shaped device 23 in the lower portion of the container, and still further because of the close spacing of the feed tube 22 to the bottom wall 14 of the vibratory cylinder 13, continued and controlled feed of the particulate material is assured, even from a large volume reserve container, and without excessive build-up at any point in the system, including the interior of the vibratory cylinder 13. The arrangement of the reserve supply container and of the feed tube 22 also provides for precise control of the quantity of powder being fed merely by regulation of the vibration of the vibratory cylinder, as by the control shown at 45 in FIG. 1.

With equipment of the kind illustrated and described, when handling an abrasive particulate material, for instance averaging in a range from about 0.3 to 100 microns, the vibratory cylinder 13 may even be reduced in size to about 1 inch in diameter, depending on the powder being dispensed.

The Second Embodiment is described as follows:

In the embodiment of FIGS. 8 to 15, the equipment is mounted in large part within a cabinet of generally rectangular shape, as appears from FIGS. 8 and 11. This cabinet is generally indicated in those Figures by the reference character 47, and it will be seen that the cabinet has a front panel 48 on which a number of the devices and controls are mounted.

The pressurized chamber 49 and the superimposed reserve supply container 50 are mounted on the bottom of the cabinet, for instance by a base plate 51, the upper portion of the reserve supply container 50 projecting above the top of the cabinet as clearly appears in FIG. 8. The chamber 49 and the reserve supply container 50 are substantially cylindrical components of the same diameter, and are brought together in end-to-end relation with an intervening pressure seal 52. The bottom end of the pressurized chamber 49 may be closed or sealed in any convenient manner, as by pressure-tight connection with the plate 51, and by the closure element 53. The upper end of the reserve supply container 50 is fitted with a lid formed of a central plate 54 and a surrounding ring 55. The ring 55 has a threaded connection 56 with the side wall of the reserve container 50, and the central plate 54 has a pressure-sealing ring 57 providing a pressure-tight joint between the plate and the upper end of the container 50.

An aperture 58 through the plate 54 is provided for the purpose of facilitating introduction of powder material to be handled by the equipment, and a closure element 59 is pivotally mounted on the plate 54 for oscillative movement to open and close the aperture 58. A knurled knob 60 is connected with the closure element 59 and provides for shifting movement of the closure element 59 between open and closed positions. A sealing ring 61 provides for pressure-tight closure of the aperture 58 when the closure element 59 is closed.

A feed chamber or cylinder 62 is arranged in the pressurized chamber 49, this chamber having a helical feed groove 63 on the inside providing for upward feed of particulate abrasive material from the bottom wall 64 of the chamber 62. This feed chamber is mounted on a support 65 and is adapted to be vibrated under the influence of the vibratory unit indicated at 66 in order to provide for upward helical feed of powder material from the wall 64 at the bottom of the feed chamber 62 upwardly through the helical groove 63 for delivery into the entrance end portion of the delivery duct 67 (see FIGS. 13, 14 and 15).

The abrasive or powder material being fed by the system is delivered to the upper surface of the bottom wall 64 of the vibratory chamber 62 from a chamber formed within the reserve supply container 50 by the conical wall 68. This wall is upwardly flared and may be charged by opening the closure element 59 and introducing the powder material through the loading aperture 58, or by unscrewing and separating the ring 55. The lower end of the conical wall 68 is connected with the feed tube or pipe 69 which extends downwardly to a level closely adjacent to the upper surface of the bottom wall 64 of the vibratory feed cylinder or chamber 62. A hollow and apertured baffle element 70 is positioned in the lower end or neck of the conical wall 68, this element having an upwardly presented peak or imperforate cone 71 serving to laterally distribute the powder material in the upper portion of the conical chamber 68 during the downward feed of the particulate material in the reserve chamber. The baffle element 70 serves to support some of the weight of the powder material in the reservoir provided within the conical wall 68, and thereby prevent excessive downward pressure, particularly when the reserve chamber is full. However, the surfaces of the conical wall 68 and of the baffle element 70 with its upwardly inclined peak 71 are arranged at angles which will provide some support for powder in the upper portions of the supply chamber but which will permit downward delivery of all of the powder material into and through the feed tube 69 as the powder is delivered to a point of use. This will assure the maintenance of the desired film or layer of powder on the upper surface of the bottom wall 64 and will also assure maintenance of a constant pressure on the bottom wall 64 regardless of the amount of powder remaining in the reserve supply container. These features provide for the continued maintenance of a supply of powder to be delivered into the entrance end of the helical feed groove 63, and also provide for uniform feed of the powder into and upwardly through the helical channel and into the entrance of the delivery duct 67. For reasons more fully pointed out hereinafter, this arrangement of the reserve supply chamber 68 and the feed tube 69 is of great importance in establishing uniformity of feed of the powder particles in the system.

The system of FIGS. 8 to 15 is pressurized by the admission of a pressurized gas such as air through the connection 72 which delivers the air through the wall of the chamber 49. This pressurizes the lower end of the system below the conical wall 68 for the reserve supply of powder, including the interior of the cylinder 62 on which the helical feed groove is provided. This air under pressure is used in the manner described hereinafter in the pick-up and feed of the powder material into and through the delivery duct 67.

As in the first embodiment, it is desired that the reserve powder supply chamber also be pressurized, preferably at the same pressure as that established in the lower portion of the equipment including the cylinder 62 with the helical feed groove. For this purpose, air under pressure is delivered from the interior of the pressurized chamber 49 through a filter 73 which is positioned at one side of the vertical feed tube 69. As viewed in FIG. 13, this air enters the filter through the entrance opening indicated at the righthand end of the filter, and the air is delivered from the filter through a connection 74 which is coupled with the vertical pipe 75 extended upwardly through the conical wall 68 for delivery into the upper end of the reserve supply chamber. The air enters the reserve supply chamber preferably at a level above the normal maximum filling level indicated at 76 in FIG. 13.

Provision is also made for depressurizing both the feed chamber and the reserve supply chamber concurrently through a common discharge connection. This connection includes the upright tube 77 having its inlet end above the upper level 76 for the reserve supply, and the tube 77 extends downwardly through the conical wall 68 of the reserve supply chamber, being connected at its lower end by the tube 78 with the discharge connection 79.

The air supply connection 72 and the air discharge connection 79 are provided with controllable valves described hereinafter, and this system provides for concurrent pressurizing of the feed chamber and reserve supply chamber of the equipment in preparation for active use for abrasion purposes and also for concurrent depressurizing of both chambers, for instance at times when it is desired to open and reload the reserve chamber by shifting the closure element 59 by means of the operating knob 60.

As is pointed out hereinafter, the controllable valve provided in the discharge connection 79 provides for depressurizing not only the upper reserve supply chamber, but also the lower feed chamber 49. The presence of the filter 73 in the connection 74–75 between the feed chamber and the reserve supply chamber is of particular importance when relatively fine powder-type materials are being handled. The feed chamber 49 encloses the cylinder 62 having the helical particle feed groove 63, and as brought out above, this mechanism is vibrated during the operation of the equipment, and this vibration may tend to disburse some fine particles of material within the feed chamber 49. The filter 73 will filter out such disbursed materials and will, thus, prevent or reduce the discharge of such powder through the discharge connection 79 when the controllable valve referred to hereinafter is opened in order to depressurize the whole system.

Attention is now directed to the arrangement of the delivery duct or feed tube 67 which receives the abrasive powder from the upper portion of the helical feed groove 63 and which also receives pressurized air from the interior of the equipment, thereby establishing an abrasive-laden pressurized air stream for delivery to a point of use. In a typical installation, a delivery nozzle is provided, being indicated at 80 in FIGS. 8 and 12, this delivery nozzle being coupled with the supply connection 81, which, in turn, is connected with the delivery duct 67. The supply connection 81 is preferably formed of flexible plastic tubing for convenience in manipulation of the nozzle 80.

As will be seen from FIGS. 13, 14 and 15, the helical particle feed channel is penetrated by the tube 67a near the upper end of the helical feed channel, thereby providing a horizontally presented delivery opening 82. The delivery duct 67 which is connected with the supply connection 81 thus has a tubular entrance end portion 67a receiving the powder horizontally from the helical feed channel. From FIGS. 13, 14 and 15, it will also be seen that the opening 82 is at least as high as the entrance end portion of the delivery duct tube 67a. In the embodiment illustrated in FIGS. 13, 14 and 15, the entrance end portion of the delivery duct extends substantially horizontally from the region of the opening 82 which communicates with the helical feed channel 63. This entrance end portion of the delivery duct extends substantially tangentially from the turn of the helical feed channel with which the delivery duct communicates, and this provides for steady delivery of the powder being fed from the helical feed channel directly into the entrance end of the delivery duct. As above indicated, the entrance end portion of the delivery duct comprises a tubular part 67a which actually penetrates not only through the wall 62 of the feed chamber, but also into the turn of the helical feed channel 63, as clearly appears in FIG. 15, having the inlet opening 82 substantially bridging the width of the helical feed channel. This also serves to assure feed of all of the powder material being advanced by the vibration into the delivery duct.

The arrangement as described provides for control of the quantity of powder being fed by adjustment of the frequency or amplitude of the vibration of the feed chamber 62, all of the powder being carried by the helical channel 63 being delivered into the opening 82 of the entrance end tube 67a of the delivery duct, and being immediately entrained at that point into the air stream which also enters that opening (82) and establishes a uniform abrasive-laden gas stream at whatever feed rate is being employed.

In connection with the feed of the powder material by the vibration of the feed chamber 62, it is to be noted that only a slight spacing is provided between the supply tube 69 and the bottom wall 64 of the feed chamber, this dimension being identified in FIG. 1 and referred to above in connection with the description of the first embodiment. With any adjustment of the vibration and thus of the feed rate, the reserve supply of powder will continue to flow downwardly through the tube 69 onto the bottom wall 64 of the feed chamber. Thus, if the vibration rate is increased, the action will increase the entrance of powder into the lower end of the helical feed channel, and additional reserve supply will flow downwardly through the tube 69 to the bottom wall, in order to maintain the desired layer of powder on the bottom wall 64 under all conditions of operation. The spacing of the feed tube from the bottom wall, and the relative diameters of the feed tube 69 and the feed chamber 62, are such that in the absence of vibration, the downward flow of the reserve supply will terminate, until vibratory action is resumed. In other words, the diameter of the feed tube 69 and of the chamber 62, and the spacing between the lower edge of the feed tube and the bottom wall of the chamber, are such that the angle of repose of the particular powder being fed will result in termination of the downward flow from the reserve supply whenever the vibration is terminated. Thus, the reserve powder supply will not flood the interior of the feed chamber when the vibration has been terminated.

Starting and stopping of the vibration not only starts and stops the feed from the nozzle, but also starts and stops the feed from the reserve supply to the bottom wall of the feed chamber.

With the foregoing in mind, it will be seen that the rate or amplitude of the vibration is employed to regulate the rate of feed of the powder. Pressure changes will, of course, influence the velocity of discharge or delivery of the abrasive powder from the nozzle, but will not alter the overall rate of powder feed per unit of time.

The entrance end portion 67a of the delivery duct may be somewhat downwardly inclined from the opening 82, but it is of importance in establishing uniformity of feed that the entrance end portion of the delivery duct be either horizontal or downwardly inclined from the level of the horizontally presented opening 82 in the upper portion of the helical feed groove. At points downstream of the entrance end portion, the delivery duct may be extended upwardly or downwardly and may be extended either below or above the level of the horizontally presented delivery opening 82 and the immediately associated portion of the delivery duct 67a.

It is further to be noted that the portion of the delivery duct 67 which extends from the tube 67a to the point where the duct passes through the wall of the feed chamber 49 (see FIG. 14) is formed of a flexible tube, for instance a plastic tube; and this tube is preferably provided with a tubular metallic fitting 83 where the delivery duct penetrates the wall 49 of the feed chamber, for connection with the supply connection 81 which is extended to the nozzle 80. The tube 67 preferably extends at least part way around the feed chamber in order to provide effective isolation of the vibration and prevent communication of the vibration to the surrounding pressurized chamber.

For purposes of control, the flexible tube 81 which carries the abrasive nozzle 80 is preferably provided with a pinch tube shut-off valve 84 which may be mounted either on or independently of the cabinet, but preferably on the front panel, as indicated in FIG. 8. This pinch tube shut-off device is advantageously of the type disclosed in my prior application Ser. No. 717,585 above-identified and comprises a block 85 having a bore extended therethrough and through which the supply connection 81 is extended. Desirably, a porous rubber or similar collapsible sleeve 86 surrounds the tube 81 in the transverse duct. The block 85 also has a transverse aperture through which a plunger 87 extends, this plunger being shiftably movable by a piston 88 in order to pinch and close the tube 81 or release and open the tube.

The pinch tube shut-off device above described and more fully disclosed in my copending application Ser. No. 717,585 is arranged so that the tube 81 may be shifted in position and thereby bring different portions of the tube into registry with the shut-off plunger 87. Similarly, the porous sleeve 86 may also be shifted, and in this way, provision is made for bringing the shut-off device into operation in different areas of the tube and sleeve, and thereby greatly extend the life of those parts. This is of particular importance in equipment of the kind herein disclosed in which an abrasive nozzle 80, or the like, is used in the machining of various parts, for instance, electronic and computer components, such as chips, for which purpose, repeated controlled shut-off and opening of the abrasive feed line is desired.

For purposes of control of the shut-off valve 84, the piston 88 is arranged within a cylinder 89 and a pressure connection 90 is provided, the pressure connection being subject to control by the valve 91 operable under the influence of the solenoid 92, for instance, in the manner fully described in my companion application Ser. No. 717,585, identified above. For purposes of control, the solenoid 92 is preferably a normally closed solenoid, as will be understood from the description above regarding the normally closed solenoid used for the delivery line of the first embodiment (see FIG. 1), and also as will be understood from the description of the control system for the second embodiment given hereinafter with particular reference to FIGS. 9 and 12.

Turning now to the schematic diagram of FIG. 12, it will be seen that the gas pressure supply line 72 delivers the pressurized gas through a pressure relief valve 93, the pressurized gas being derived from a source indicated at 94 which delivers the pressurized gas to the line 72 through a pinch tube shut-off valve 95 which may be of the kind described above and also in the companion application Ser. No. 717,585 above identified.

As shown in FIG. 12, the gas being admitted to the system sequentially flows through appropriate filters for removal of water and oil and then flows through the normally closed solenoid-operated valve 96 which delivers the pressure not only through the line 72, which extends into the feed chamber 49, but also through the line 97 which supplies pressurized operating fluid to the solenoid-operated pinch tube shut-off device 84 for the delivery line 81 and to a similar solenoid-operated pinch tube shut-off device, generally indicated at 98, which may be of the same general construction described above with reference to FIG. 10 and also fully disclosed in my companion application Ser. No. 717,585 above identified. The pinch tube shut-off device 98 is preferably a normally open solenoid-operated valve and is positioned in the discharge line 79 which is provided for depressurizing the system.

The line 72 desirably has a pressure regulator 99 therein, the pressure being adjustable by means of the control indicated at 100, provided on the control panel 48, a gauge 101 further being provided on the panel of the cabinet (see FIGS. 8 and 12). This provides for adjustment of the delivery pressure for the abrasive-laden air stream discharged from the nozzle 80.

As seen in FIG. 12, the system also includes a pressure regulator 102 in the line 97 which extends to the solenoid-operated pinch tube shut-off devices 84 and 98.

Turning now to the schematic wiring diagram shown in FIG. 9, where a number of the components already mentioned are indicated.

In addition, in FIG. 9, there is shown a main shut-off switch 103 for shutting off the electrical supply to the entire system. When the main shut-off switch is closed, the amber signal light indicated at 104 will be turned on (see also FIG. 8). Closing the main switch 103 will also energize the solenoid 98 which, being a normally open solenoid control, will close the solenoid 98 and, thus, permit the build-up of the desired pressure in the system. Activation of the main switch 103 may be effected by the master control switch indicated at 105 on the front panel shown in FIG. 8. In this condition, however, the system is inactive, in that the normally closed solenoid-operated pinch valve 84 has not been supplied with operating current and will remain in closed position. In addition, the vibrator 66 will also be in inactive condition, because the current has not yet been delivered to that unit.

When it is desired to employ the unit for an active abrasion operation, the AJM switch indicated at 106 is turned on, with resultant activating of the green signal lamp 107. This results in activation of the normally closed solenoid-operated pinch valve 84 in the delivery duct 81, and also results in the delivery of current to the vibrator 66. Preferably, an adjustment rheostat 108 is provided in the vibrator circuit, and this rheostat is preferably mounted on the panel of the cabinet, as indicated in FIG. 8.

If desired, the system may be provided with a heater indicated at 109 in the diagram of FIG. 9.

When the manual control switch 106 is opened, it will be seen that the vibrator 66 is disconnected, and in addition, the normally closed solenoid 84 in the delivery line will shut off the flow, and thereby terminating the abrasion operation.

In the system as described and illustrated, the pressure of the pneumatic system may be adjusted by the control 100 in order to meet varying conditions of operation, and in addition, the rate or intensity of vibration may also be adjusted, in order to provide the desired operating conditions.

A supplemental switch for turning the unit on or off, such as indicated at 106a in FIG. 9, may be provided. For example, in some installations, instead of operating the switch 106 manually, a foot-operated switch 106a may be positioned for convenient access to the foot of an operator.

Features of Both Embodiments

In connection with both of the embodiments disclosed in the present application, it is to be noted that the rate of feed of the powder into the delivery duct and thus to the abrasion nozzle is established by the vibration of the feed cylinder (13 in FIG. 1 and 62 in FIG. 3) and the helical feed groove (17 in FIG. 1 and 63 in FIG. 13) on the cylinder wall independently of other factors. Increase or decrease of the frequency or amplitude of the vibration will alter the quantity of the powder fed from the bottom wall of the cylinder through the helical feed groove and into the delivery duct associated with the delivery port 82 located in the upper portion of the helical feed groove. Variation in the pressure or velocity of the pressurized gas entering the entrance end portion of the delivery duct will not alter the quantity of powder being delivered into the entrance end portion of the delivery duct.

The feeding action of the helical feed groove also depends upon the pressure and thus the feed of the powder from the bottom end of the duct which delivers the powder downwardly from the reserve supply chamber in the upper part of the equipment to the bottom wall (14 in FIG. 1 and 64 in FIG. 13) of the feed cylinder in which the helical groove is provided. With a spacing, such as indicated at AB in FIG. 1, between the bottom wall of the feed cylinder and the lower edge of the feed tube extended downwardly from the reserve supply chamber, and also with the powder supporting element (23 in FIG. 1 and 70 in FIG. 13), the pressure of delivery of the powder onto the bottom wall remains constant, regardless of the level or quantity of powder present in the reserve supply chamber. With such constant pressure, the upward feed of the powder in the helical feed groove will deliver powder at a constant rate into the entrance end of the delivery duct, and that rate will be determined by the frequency or amplitude of the vibration of the helical feed channel.

I claim:

1. Apparatus for feeding particulate material into a gaseous stream comprising means defining a helical powder feed channel with its inlet in a lower portion thereof and inclined upwardly to an outlet, mechanism for vibrating said feed channel to effect upward feed of powder particles in the channel, a pressurized chamber having walls surrounding and spaced from the feed channel and mounted independently of the vibratory feed channel, a gas flow duct penetrating a wall of the pressurized chamber and having an upwardly open upwardly presented inlet orifice within the pressurized chamber, said gas flow duct and its upwardly presented inlet orifice being mounted independently of the vibratory feed channel, and a conduit mounted independently of said duct and rigidly connected with the vibratory feed channel and having a straight inlet end passage positioned in substantially tangential relation to the vibratory helical powder feed channel to receive particulate material from said channel and having an outlet opening positioned above the inlet orifice of said duct to deliver particulate material downwardly into the upwardly presented inlet orifice of said gas flow duct, the outlet opening of said conduit being vibratory with the feed channel independently of the inlet orifice of said gas flow duct, the inlet end of said flow duct comprising an upwardly flared funnel, and the delivery end of said conduit extending downwardly into said funnel in spaced relation to the walls thereof.

2. Apparatus for feeding powder particles into a pressurized gaseous stream, including
    a feed chamber having an upright cylindrical wall and a bottom wall connected with the lower end of said cylindrical wall,
    means for feeding a powder to the upper surface of said bottom wall,
    a helical particle feed channel on the inside surface of said cylindrical wall having an entrance portion adjacent to and adapted to receive powder from the upper surface of said bottom wall and also having a delivery opening in an upper region of the channel,
    means for vibrating said feed chamber including said cylindrical wall and said bottom wall to effect upward helical feed of powder from the powder on the bottom wall,
    the means for feeding powder to the upper surface of the bottom wall of the feed chamber including a reserve powder supply chamber above the feed chamber and means including a supply tube having a downwardly presented delivery port spaced from the bottom wall of the feed chamber for feeding the powder from the reserve supply chamber,
    means for spacing the supply tube in relation to the bottom wall of the feed chamber to provide for formation of a powder deposit on the bottom wall having a diameter less than the diameter of the bottom wall when the reserve powder supply chamber is being charged with the feed chamber in non-vibratory state,
    means for controlling the quantity of powder particles being fed comprising adjustable means for varying the vibration of the feed chamber and thereby provide an adjustable normal operating feed range for the quantity of powder fed upwardly through said helical channel from the deposit on the bottom wall of the feed chamber to the delivery opening in the upper region of the channel,
    the size of the delivery opening in the upper region of the feed channel being sufficient to accommodate all the powder fed even at the upper end of the normal operating feed range,
    a pressurized gas chamber having wall surrounding the feed chamber,
    and pressurized gas flow means for entraining powder delivered through said delivery opening including a delivery duct communicating with said pressurized gas chamber and with said feed channel through said delivery opening, said delivery duct having a tubular entrance end portion communicating with the helical feed channel through said opening and extended through the surrounding wall of the pressurized gas chamber to provide for delivery of all of the powder being fed upwardly in said helical channel into and through the duct in a pressurized gas stream extended to a point exterior of the pressurized gas chamber even at the upper end of the noraml operating feed range.

3. Apparatus as defined in claim 2 in which said tubular entrance end portion of the delivery duct communicates with the helical feed channel through said delivery opening of the helical particle feed channel and extends substantially tangentially from the helical channel and substantially horizontally from said inlet opening through the wall of the pressurized gas chamber surrounding the feed chamber.

4. Apparatus as defined in claim 2 and further including means maintaining substantially constant weight pressure of the powder delivered from the reserve powder supply chamber into said powder deposit on the bottom wall of the feed chamber as the quantity of the powder in the reserve powder supply chamber diminishes.

* * * * *